United States Patent [19]

Fleming

[11] 3,722,796

[45] Mar. 27, 1973

[54] SLIDE RULE CURSOR

[75] Inventor: Jack Fairchild Fleming, Morris Plains, N.J.

[73] Assignee: Sterling Plastics Co., Mountainside, N.J.

[22] Filed: May 11, 1971

[21] Appl. No.: 142,267

[52] U.S. Cl. ............................................... 235/70 B
[51] Int. Cl. ............................................... G06g 1/02
[58] Field of Search ...................... 235/70 R, 70 B

[56] References Cited

UNITED STATES PATENTS

| 2,643,059 | 6/1953 | Gaire | 235/70 B |
| 2,968,438 | 1/1961 | Bachmann et al. | 235/70 B |

FOREIGN PATENTS OR APPLICATIONS

| 859,504 | 6/1940 | France | 235/70 B |

*Primary Examiner*—Richard B. Wilkinson
*Assistant Examiner*—Stanley A. Wal
*Attorney*—Albert C. Johnston

[57] ABSTRACT

A slide rule is provided with a cursor comprising two transparent face plates, each carrying a hairline indicator, which are joined together and hold an end slide member between them at each end of the cursor by connecting means which include an eccentric adjusting member that can be displaced incrementally by a user of the slide rule so as to displace one of the face plates relative to the other for precise realignment of the positions of the hairlines relative to scales on both sides of the rule.

6 Claims, 6 Drawing Figures

Patented March 27, 1973 3,722,796
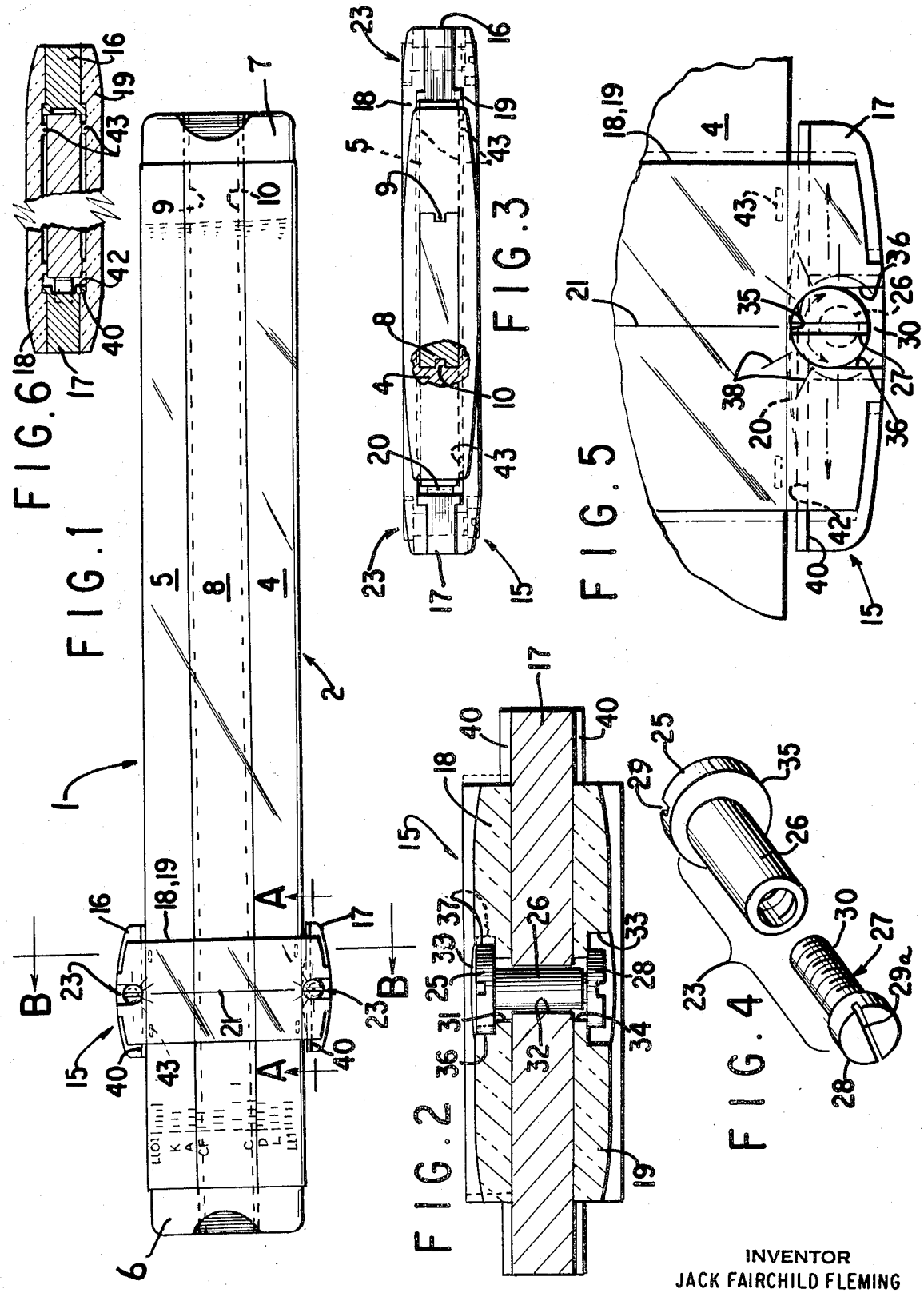
INVENTOR
JACK FAIRCHILD FLEMING
BY
Albert C. Johnston
ATTORNEY

SLIDE RULE CURSOR

The present invention relates to a slide rule and more particularly to a new construction of the cursor provided for correlating points on the scales of a slide rule.

A slide rule is a well known mathematical instrument useful for multiplication, division and other mathematical functions. Generally it consists of an elongate body having two parallel body portions rigidly fastened together, a slide movable longitudinally between these body portions, and a transparent cursor which carries a hairline indicator and can be moved left or right over scales on the faces of the body and the slide.

Slide rules are made with as many as four mathematical scales on each face of the slide and as many as three scales on each face of each body portion, i.e., as many as ten scales on each side and 20 scales on the whole rule. Some of these scales often enable complex calculations such, for example, as those of Ohm's law functions or of the reactance of a given inductance or capacitance at a given frequency.

In order to utilize scales on both sides of the slide rule, the cursor comprises two transparent face plates, one on each side of the rule, each of which carries a hairline lying parallel to a face of the rule and perpendicular to the direction of movement of the cursor.

It is sometimes desirable to be able to secure computations from scales on both sides of the rule at a given setting of the cursor. The ability to do this accurately is, however, often difficult to assure, for slight deviations from a perfectly registered relationship of the scales on one side with those on the other side may occur inevitably in the process of imprinting the scales — particularly when the scales are imprinted on one side and then on the other by subjecting the rule body to two successive roller- or die-imprinting operations. It is also possible, though unusual or the result of an accidental distortion of the body member, that the respective scales on the two parallel body portions of the rule may lie slightly out of the desired positions of perfect alignment perpendicular to the direction of movement of the cursor.

The principal object of the present invention is to provide a slide rule with a cursor that may be readily adapted by the user to give accurately correlated readings from scales on either or both sides of the rule even though the scales on one side, or on one body portion, may deviate from a perfectly registered relationship to those on the other side, or the other body portion, of the rule.

According to the present invention, the transparent face plates have at each end of the cursor confronting end portions which protrude beyond an outer longitudinal edge of the rule body where they are joined together, with an end slide member held between them and bearing against that edge, by connecting means which include an adjusting member that is displaceable incrementally by a user of the rule so as to displace one face plate laterally relative to the other for precise adjustment or realignment of the positions of the hairlines on the face plates relative to the scales on the rule body.

The adjusting member desirably is a turnable element having eccentric portions thereof which bear laterally and slidably against respective mating wall portions of one of the confronting plate end portions and of the end slide member adjacent thereto. A part of this element is accessible for angular displacement thereof by a user of the slide rule. That part has an indicator on it so related to an indexing scale on said one end portion that the position and increments of displacement of the adjusting member are readily observable. An eccentric headed sleeve nut conveniently is used as the adjusting member, a slot in its head serving as the position indicator, with the rest of each end connecting means constituted by a headed screw that extends through the other of the confronting plate end portions and is threaded into the sleeve of the eccentric nut so as normally to hold the cursor end parts firmly together.

In the event that the hairlines on the face plates of the cursor are found by a user of the slide rule to be imperfectly aligned with the scales on either side of the rule body, the user may himself adjust the relative positions of the face plates at both or either of their ends so as to bring about the desired adjustment or realignment of the hairlines. By loosening the connecting means at each end of the cursor, holding the hairline on one face plate in register with the scales on that side of the rule body, and then incrementally displacing the adjusting member at each end — as by turning the head of the eccentric sleeve nut above mentioned, the hairline on the other face plate can be brought into precisely registered relation to the scales on its side of the rule body. Then the connecting means may be re-tightened to keep the cursor in the desired adjusted condition.

Other objects, features and advantages of the invention will be apparent from the following detailed description of a preferred embodiment thereof, wherein reference is made to the accompanying illustrative drawing. In the drawing:

FIG. 1 is a plan view of a slide rule provided with a cursor embodying the present invention;

FIG. 2 is an enlarged side cross-sectional view of a portion of the cursor, taken along line A—A of FIG. 1;

FIG. 3 is an enlarged end view, partly in section, of the slide rule and the cursor thereon;

FIG. 4 is an enlarged exploded perspective view of the connecting and adjusting device used for each end of the cursor;

FIG. 5 is an enlarged fragmentary plan view of an end of the cursor; and

FIG. 6 is a cross-sectional view of the rule body and cursor, centrally broken away, taken along line B—B of FIG. 1.

As shown in FIG. 1, the slide rule 1 comprises an elongate body 2 having lower and upper parallel rails or body portions 4 and 5 which are spaced apart to receive a slide 8 that fits and is movable longitudinally between them. Body portions 4 and 5 are held in a fixed parallel relationship by end members 6 and 7 fixed to their opposite ends. Grooves running the length of the slide 8 in its top and bottom edges fit slidably upon guiding ribs 9 and 10 which protrude from the inner longitudinal edges of the body portions 4 and 5, so that any scale on the slide can be slid to any selected location relative to a scale or scales on the body of the rule.

The side of the slide rule shown in FIG. 1 has a number of mathematical scales formed thereon by indicia applied to the face of body 2 and the corresponding face of slide 8. For example, the LL01, K and A scales may be applied to body portion 4, the scales D, L and LL1 to body portion 5, and scales CF, CIF, C1 and C to the slide. The other side of the slide rule (not shown) is similar in structure to the side shown in FIG. 1, except for differences in the scales applied. For instance, the D, LL3 and LL2 scales may be applied to the back face of body portion 4, the LL02, LL03 and DF scales to the back face of body portion 4, and the B, T, ST and S scales to the back face of the slide.

A cursor 15 mounted on the rule body 2 is slidable to and fro therealong over the scales. The cursor comprises two transparent face plates 18 and 19, one on each side of the rule body, each of which has a thin dark hairline 21 applied to its inner surface along its vertical centerline so that each hairline will enable visual alignment and correlation of selected points on the scales of the rule body 2 and slide 8 at one side of the rule.

The face plates have at each end of the cursor end portions which protrude beyond the adjacent outer longitudinal edge of the rule body, where they are joined together with an end slide member 16 or 17 held between them. The upper end slide member 16 bears directly upon the upper edge of body portion 5. The lower end slide member 17 bears against the lower edge of body portion 4 through a thin metal ribbon spring 20 which has ends positioned in a recess in the bottom of end slide member 17 and has a central portion that presses yieldably against the longitudinal edge of body portion 4 so as to exert a pressure sufficient to hold the cursor at any position to which it is slid along the slide rule body, yet enabling easy sliding movement of the cursor along the scales.

Each of the face plates has small integral projections 43 formed on its inner surface to bear and slide upon the face of the rule body at locations near its outer longitudinal edges. Each end portion of each face plate also has a straight edge portion 42 recessed in its inner surface to mate with a protruding straight edge portion, or flange, 40 formed along one side of the adjacent end slide member 16 or 17 so that even when adjacent plate ends and the end slide member between them are loosely interconnected the pressure of the spring 20 will hold the mating straight edge portions 40 and 42 together and thus keep the hairline 21 perpendicular to them and to the scales on the slide rule.

The end portions of the face plates and the end slide member between them at each end of the cursor are held together by connecting means 23 which will serve for firmly joining these parts together and which include an adjusting member that can be displaced incrementally by a user of the slide rule so as to displace one face plate laterally relative to the other for precise lateral adjustment or realignment of the hairlines 21 on the two face plates relative to the positions of the scales on the rule body 2.

As shown in FIG. 4, each connecting means 23 comprises an eccentric headed sleeve nut 25 and a mating headed screw 27. The sleeve nut in this embodiment constitutes the adjusting member, and the screw coacts with it for holding together the parts at each end of the cursor. The nut 25 has a rounded head 35 which is integral with but eccentric to a cylindrical sleeve 26 that has internal screw threads. The axis of head 35 thus is offset laterally relative to the axis of sleeve 26. A slot 29 in the outer surface of head 35 enables nut 25 to be turned, for example, by a small coin or a screwdriver, and is aligned with the eccentricity of sleeve 26 so as to constitute a readily observable indicator of the position of adjustment of the sleeve nut. The screw 27 consists of a head 28 externally slotted at 29a and an integral, externally threaded shank 30 which screws into the sleeve 26 of nut 25.

Each end portion of each face plate has a recess 33 formed in its outer surface to receive the head 35 of nut 25 or the head 28 of screw 27. Each recess 33 has a side wall 36 (FIGS. 2 and 5) of U-shaped configuration which includes at the base thereof an arcuate wall portion that will engage laterally with the peripheral surface 37 of head 35 of a sleeve nut 25 if that head is in the recess. An opening 31 or 34 of larger diameter than sleeve 26 extends through each plate end portion from the recess 33 therein. Each opening 31 or 34 is aligned with an opening 32 extending through the adjacent end of slide member 16 or 17, i.e., the axes of the openings are aligned. Opening 32 has a diameter only slightly larger than that of sleeve 26, so that it will serve as a journal for the sleeve portion of eccentric nut 25, not permitting lateral displacement thereof relative to the end slide member.

An eccentric sleeve nut 25 extends through opening 31 of one face plate at each end thereof and then through opening 32 of the adjacent end slide member, while a screw 27 extends through opening 34 at each end of the other face plate and is threaded into the sleeve 26 of the related nut 25. When the screw and nut at each end are tightly threaded together, the related plate end portions and end slide member are firmly clamped together. When the screw is loosened, the head 35 of the eccentric nut may be turned to turn the nut about the axis of its sleeve 26 held in the opening 32 of the end slide member. In this way, the side surface 37 of head 35 is displaced laterally and it correspondingly displaces the related end portion of the face plate by a cam action on recessed wall portion 36.

An indexing scale is provided on the outer surface of each plate end portion adjacent to the recess 33 therein, to indicate the position and increments of adjustment of the eccentricity of the adjusting member, or nut 25, by enabling observation of the relation of the position of head slot 29 to points of this scale. The indexing scale shown has six radial lines 38 spaced apart at intervals of 36 degrees about the center of opening 31. In a typical embodiment of the invention, the axes of sleeve 26 and head 35 of each nut 25 are spaced apart by a distance of 0.025 inch, so that the maximum extent of displacement of the face plate end engaged by the nut head 25, as produced by turning the nut through an arc of 180°, amounts to 0.050 inch. Each of the five subdivisions between the lines 38 of the indexing scale thus corresponds to 0.010 inch of displacement of an end portion of one face plate, say of plate 18, laterally relative to the confronting end portion of the other face plate.

The invention may be utilized in various forms and arrangements of parts differing from those of the particular embodiment herein described and illustrated in the drawing. It is not intended to be limited to that manner of embodiment except as required by fair construction of the appended claims.

I claim:

1. A slide rule comprising an elongate body having spaced parallel body portions, a slide movable longitudinally between said body portions, correlated scales on the faces of said body portions and of said slide, and a cursor slidable upon and along said body, said cursor including at each side of said body a transparent face plate having a hairline thereon for indicating correlated points of said scales, each end of said cursor comprising confronting end portions of said plates extending beyond a longitudinal edge of said body, an end slide member held between said end portions and bearing upon said edge and means connecting said end portions and said member together, each said connecting means including an adjusting member that is displaceable incrementally by a user of the slide rule so as to displace one of said end portions laterally relative to the other for precise adjustment of the positions of the hairlines relative to said scales.

2. A slide rule according to claim 1, each said adjusting member being a turnable element comprising at distinct axial locations thereof eccentric portions thereof which bear laterally and slidably against respective mating wall portions of one of said end portions and of the end slide member adjacent thereto.

3. A slide rule according to claim 2, said turnable element having a part thereof accessible to and displaceable angularly by a user of the rule, said part having thereon an indicator positioned according to the position of said eccentric portions, and said one end portion having thereon an indexing scale adjacent to said indicator to indicate the position and increments of displacement of said adjusting member.

4. A slide rule according to claim 1, each said connecting means comprising a headed sleeve nut constituting said adjusting member, the sleeve of which extends through openings respectively in one of said confronting end portions and the end slide member adjacent thereto, and a headed screw the shank of which extends through an opening in the other of said confronting end portions and normally is threaded into said sleeve so as to clamp the end parts of the cursor firmly together, said sleeve being eccentric to the head of said nut and being turnable but not displaceable laterally in said opening in said end slide member, and said one end portion having in its outer face a recessed arcuate wall portion thereof engaged laterally by said bead, so that when said nut is turned its head will displace said one end portion laterally relative to said end slide member and the other of said confronting end portions.

5. A slide rule according to claim 4, said head having a slot therein aligned with the eccentricity of said sleeve and said one end portion having an indexing scale thereon adjacent to said recessed wall portion to indicate the position of said slot and thus the position and increments of displacement of said one end portion.

6. A slide rule according to claim 1, each said end portion having on its inner surface a straight edge portion extending perpendicular to the hairline on the related face plate and engaging with a mating straight edge portion on the adjacent end slide member to align said hairline in perpendicular relation to said scales.

* * * * *